US006923551B2

(12) United States Patent
Galli

(10) Patent No.: US 6,923,551 B2
(45) Date of Patent: Aug. 2, 2005

(54) FLASHLIGHT MOUNTING SYSTEM

(76) Inventor: Robert Galli, 8176 Horseshoe Bend La., Las Vegas, NV (US) 89113

( * ) Notice: Subject to any disclaimer, the term of this patent is extended or adjusted under 35 U.S.C. 154(b) by 133 days.

(21) Appl. No.: 10/624,811

(22) Filed: Jul. 22, 2003

(65) Prior Publication Data

US 2004/0120142 A1 Jun. 24, 2004

Related U.S. Application Data

(63) Continuation-in-part of application No. 10/308,440, filed on Dec. 3, 2002, now Pat. No. 6,614,336.

(60) Provisional application No. 60/402,172, filed on Aug. 9, 2002.

(51) Int. Cl.[7] .............................. B32B 3/02; F21V 4/00

(52) U.S. Cl. ....................... 362/191; 362/157; 362/396; 224/420; 248/223.41; 24/522

(58) Field of Search ................................ 362/191, 396, 362/157; 224/420; 248/223.41; 24/522

(56) References Cited

U.S. PATENT DOCUMENTS 4,002,895 A 1/1977 Ketler et al. .................. 240/60
4,688,705 A * 8/1987 Miree ......................... 224/424
4,881,155 A * 11/1989 Gahagan ..................... 362/191
5,270,911 A * 12/1993 Maglica et al. ............. 362/396
5,853,242 A 12/1998 Bouffay et al. ............. 362/191
6,612,714 B1 * 9/2003 Morre et al. ................ 362/191

* cited by examiner

*Primary Examiner*—Thomas M. Sember
*Assistant Examiner*—James W Cranson
(74) *Attorney, Agent, or Firm*—Barlow, Josephs & Holmes, Ltd.

(57) ABSTRACT

A novel attachment and mounting system for a portable handheld flashlight is provided. A universal mounting bracket including a central raised channel portion and mounting tabs connected thereto is configured to slideably receive a flashlight. The bracket includes several configurations that are tailored to the mounting conditions required. For example, the bracket includes fastener, magnetic and strap mounting configurations. Further, the channel section may be mounted in a pivotable fashion to the mounting tab to allow rotation of the flashlight mounted thereto. The flashlight includes a clip on the back thereof that is slideably received in the channel section to facilitate easy mounting and dismounting of the flashlight in the bracket.

9 Claims, 8 Drawing Sheets

FLASHLIGHT MOUNTING SYSTEM

CROSS-REFERENCE TO RELATED APPLICATIONS

This application is related to and claims priority from earlier filed U.S. Provisional Patent Application No. 60/338,894, filed Dec. 10, 2001, earlier filed U.S. Provisional Application No. 60/402,172, filed Aug. 9, 2002, and is a continuation-in part of U.S. patent application Ser. No. 10/308,440, filed Dec. 3, 2002 Pat. No. 6,614,336.

BACKGROUND OF THE INVENTION

The present invention relates to a new mounting system for a portable flashlight. More specifically, this invention relates to a mounting system that allows a flashlight device to be mounted to a universal mounting receiver, which can be incorporated into a variety of assemblies there improving the overall utility of the light.

Lights have long been attached centrally to a front portion of mining helmets and other types of hard hats used for construction, maintenance, and other working conditions. Firefighter helmets and most other hats and caps, however, require discretionary attachment of lightweight and more adjustable lights. Additionally, many active sports such as cave exploration and off shore sailing require the use of lighted headgear that is light and durable. As a result, lightweight multi-function lights that are heat and water-resistant are particularly significant to people involved in these activities. It is particularly important that these flashlights be adapted to provide usable light in the required direction wile allowing both of the user's hands to remain free for the required task. In this manner, the light must be light weight and portable while being adaptable for placement in the user's head gear or for various other mounting configurations as may be required. It is further desirable that the lighting device not be so specialized that it cannot be effectively used for any function other than as a headlamp.

Numerous innovations for headgear light holders have been provided in the prior art. While these innovations may be suitable for the specific individual purposes that they address, they differ from the present invention in that they do not teach a universal flashlight receptor system that facilitates the interchangeable wear by a user and universal mounting on a surface adjacent to a work area.

For example, U.S. Pat. No. Des. 353,221 to Scott et al. teaches an ornamental design for a flashlight that is pivotally mounted to the side of the crown of a helmet using existing face shield holes and/or a rubber strap. U.S. Pat. No. 4,998,187 to Herrick teaches a headlight holder that includes an outer generally convex shape that has a base member with an upper surface and a lower surface. The lower surface has a generally concave curvature allowing it to conform to at least a portion of the convex outer surface of the users helmet. U.S. Pat. No. 4,002,895 to Ketler discloses a mounting bracket that is fixed onto a helmet and receives a mating clip on the light body thereby allowing the light to be removably affixed to the helmet. Finally, U.S. Pat. No. 5,853,242 to Bouffay provides a flashlight with a curved handle that is designed to be selectively mounted in a receiver on a helmet. While this flashlight is well suited for use in headgear, it is not well suited for separate use.

It is apparent that numerous innovations for headgear light holders have been provided in the prior art. While these innovations may be suitable for the specific individual purposes to which they address, they would not be suitable for the purposes of the present invention as heretofore described.

There is therefore a need for a simple and universal mounting system for selectively and securely receiving a compact flashlight that is rugged and suited for a variety of mounting conditions and configurations. In addition, there is a need for a mounting system that allows a universal flashlight to be incorporated into cost effective alternative to reed switches that provide a compact multifunctional switching solution.

BRIEF SUMMARY OF THE INVENTION

In this regard, in accordance with the present invention, a novel attachment and mounting system for a portable hand-held flashlight is provided. The present invention provides for an attachment clip to be fashioned in on the flashlight that allows it to be detachably mounted to a variety of surfaces. The attachment clip is preferably a spring clip provided on the rear of the flashlight as is typically well known in the art. The spring clip is spring biased against the rear of the flashlight and includes a small detent at its free end.

The clip on the rear of the light works in conjunction with several other components of the system to provide a flashlight mounting system that allows the flashlight to be securely selectibly mounted to a variety of surfaces and utilized in a variety of applications. The mounting components include a wall plate that is rigidly attached to a surface, a magnetic plate for attachment to metallic surfaces and a head gear to allow the light to be worn on the users head. All of the mounting components are configured to receive the clip on the rear of the light and selectibly retain the light in the desired mounting position.

Accordingly, an object of the present invention is to provide a flashlight mounting bracket system that avoids the disadvantages of the prior art. Another object of the present invention is to provide a flashlight mounting bracket system that is simple and inexpensive to manufacture. Still another object of the present invention is to provide a flashlight mounting bracket system that is interchangeable and is simple to use. Yet another object of the present invention is to provide a flashlight bracket mounting that is specifically designed to receive a flashlight that includes a mounting clip on the rear thereof. Still yet another object of the present invention is to provide a flashlight mounting system that can be attached to a variety of surfaces or to a user's body for a variety of conditions of flashlight use. Still yet another object of the present invention is to provide a flashlight mounting system that receives and selectibly retains a flashlight with a mounting clip on the rear thereof in an articulateable fashion.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
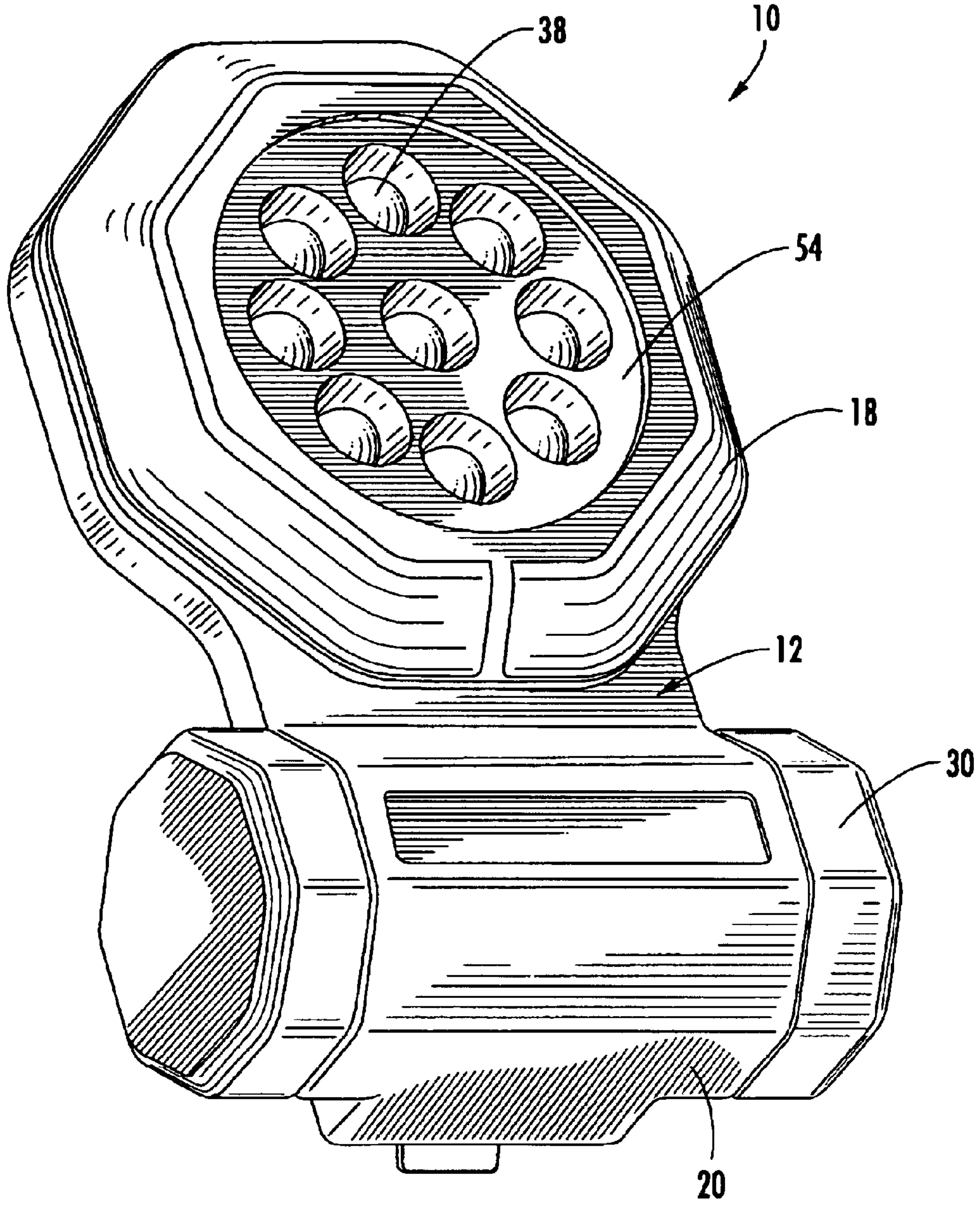
FIG. 1 is a perspective view of a flashlight incorporating the rotary switch of the present invention.

Referring now to the drawings, the preferred embodiment of the rotary switch assembly of the present invention is illustrated and generally indicated in connection with a flashlight 10 in FIGS. 1–4*a*. Further, a second embodiment of the rotary switch is also shown in connection with a traditionally shaped linear flashlight 100 in FIG. 5. While specific structure is shown utilizing the switch of the present invention within a flashlight, it should be understood by one skilled in the art that the rotary switch of the present invention has broad application that is not limited to use within flashlights. Specifically, the present invention is directed toward a rotary switch for use in any application where multi-functional switching is required.

Turning now to FIG. 1 a flashlight 10 incorporating the switch of the present invention is shown. The flashlight 10 includes an outer housing 12 that encloses the operable elements of the flashlight 10 and the switch assembly. The face of the housing 12 includes openings through which the lighting elements protrude and a compartment at the bottom for containing a battery. The bezel of the housing is rotatably mounted to the housing to allow it to operate as an actuator as will be further described below. While a circular array of nine lighting elements is shown in a circular pattern, it can be appreciated that any number of arrangement of lighting elements could be used and still fall within the scope of the present disclosure.

Figure 2:
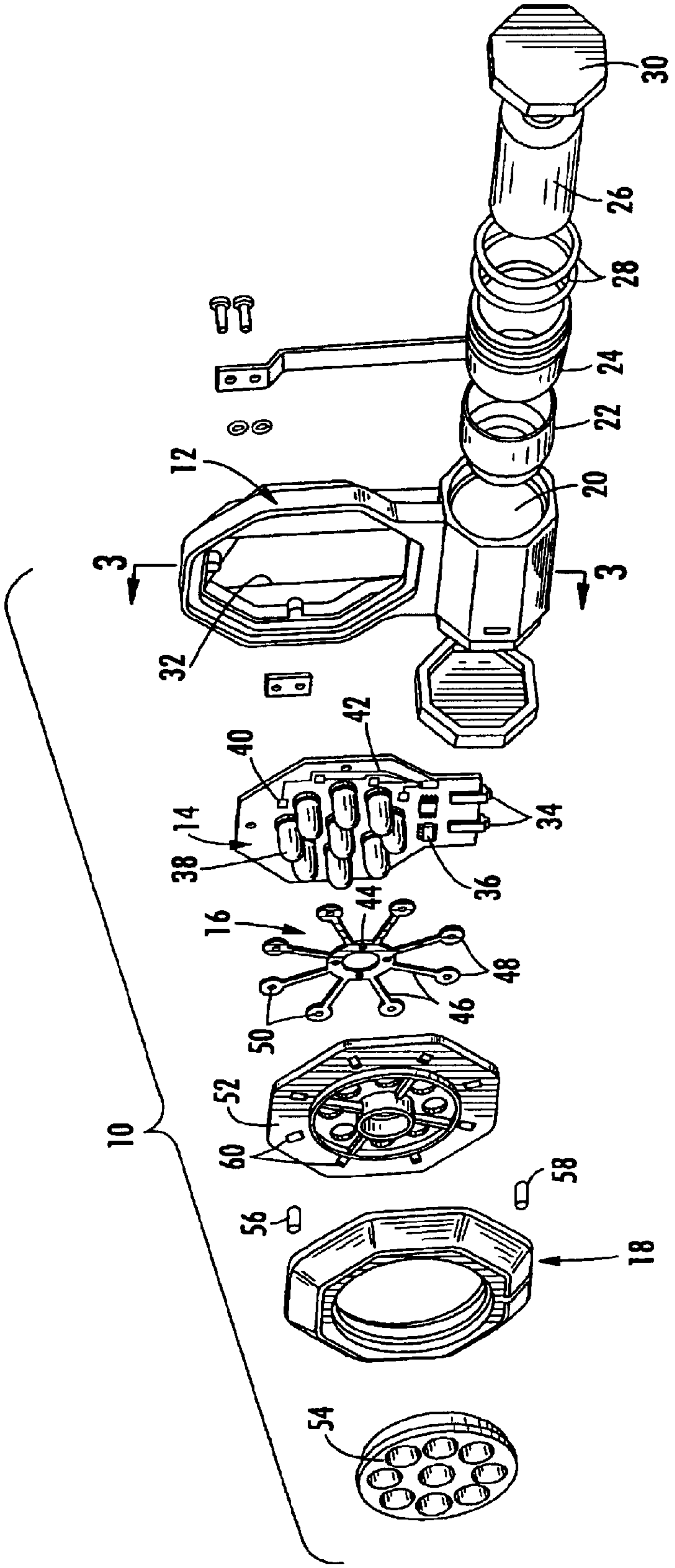
FIG. 2 is an exploded perspective view thereof.

FIG. 2 illustrates an exploded perspective view of the flashlight 10 and rotary switch mechanism of the present invention. The key elements of the switch are all shown in their relative positions to one another and include the base 14, the contact element 16 and the actuator 18. The operable elements are all assembled and installed into the outer housing 12 to form a completed flashlight 10. The housing 12 can be seen to have two interior compartments. The lower compartment 20 receives two metallic contact sleeves 22,24 that are cylindrically shaped, each having one closed end and shaped to hold a battery 26. One end of the battery 26 is in electrical communication with one of the contact sleeves 22 and the other end of the battery 26 is in electrical communication with the second contact sleeve 24. More specifically, the positive terminal of the battery 26 is in contact with the end wall of one contact sleeve 22 thereby making the entire sleeve 22 an extension of the positive terminal of the battery 26 and the negative terminal of the battery 26 is in contact with the end wall of the other contact sleeve 24 thereby making the entire sleeve 24 an extension of the negative terminal of the battery 26. Once the battery 26 is placed within the compartment 20, O-rings 28 and a threaded cover 30 are received over the end of the compartment 20 to retain the battery 26 and create a watertight seal over the compartment 20.

The base 14 is then received within the second compartment 32 of the housing 12. The base 14 is preferably formed as a printed circuit board and becomes the central operational element around which the rotary switch of the present invention is built. At the bottom edge of the base 14 are two spring biased electrical contacts 34 that extend downwardly within the housing 32. Once the flashlight 10 is fully assembled, the spring contacts 34 pass through two openings provided between the upper compartment 32 and the lower compartment 20 and in are in electrical communication with the two metallic contact sleeves 22,24 within the lower compartment 20 of the housing 12. In this manner, energy from the battery 26 travels from the battery 26 through each of the contact sleeves 22,24 respectively and into the base 14 through the electrical contacts 34 thereby providing positive and negative power from the battery 26 to the components installed on the base 14.

The base 14 is preferably formed as a printed circuit board and configured to support the electronics 36, lighting elements 38 and contact pads 40 required to make the flashlight 10 operable. The key elements of the base 14 include the contact springs 34 that draw power from the battery 26, the circuit traces 42 that direct power to the various components mounted thereon, the contact element pads 40 and the control circuitry 36 as will be more fully described below. The circuit traces 42 on the base 14 include small contact pads 40 that are distributed in an array over the face of the base 14. The contact pads 40 are simply exposed areas in the trace 42 where another contact can be selectively brought into or out of electrical communication with the contact pad 40. The contact pads 40 also may further include a small bead of solder to create a contact pad 40 that is slightly raised from the surface of the face of the base 14.

The objects to be controlled by the switch of the present invention are also connected to the base 14. In the case of the flashlight 10 of the preferred embodiment, an array of lighting elements 38 to be controlled by the switch of the present invention are mounted directly onto the base 14 with their respective leads in electrical communication with the circuit traces 42 also formed thereon. The lighting elements 38 incorporated into the present invention are preferably light emitting diodes (LEDs), however, it should be understood that because of their identical shape, configuration and form factor, conventional filament type miniature lamps could be interchangeably substituted for the LEDs. Further, while a circular array of lighting elements 38 and contact pads 40 is shown, the disclosure of the present invention is also intended to include any array of lighting elements 38 and contact pads 40 including but not limited to square, rectangular, cylindrical and/or linear.

The contact element 16 is also mounted onto the base 14. The contact element 16 generally has a common hub portion 44 with a radial array of contact arms 46 extending therefrom. The contact arms 46 are all connected to and in common electrical communication with the hub 44. Each of the contact arms 46 may include an area 48 at its free end having an increased dimension to create an enlarged contact surface. This enlarged area 48 is shown as a circular pad at the end of each contact arm 46. While this feature is helpful to overcome manufacturing tolerances, it is not a required element of the present invention. Similarly, the end of each contact arm may include a small punched dimple 50 to further enhance the contact between the contact arm 46 and the contact pads 40 on the base 14. If provided, the dimple 50 comes into contact with the switching contact pad 40 before the arm 46 reaches a completely relaxed normal state. Due to the dimple 50 holding the arm 46 in a slightly elevated position, the spring bias in the arm 46 increases the contact force between the dimple 50 and the contact pad 40 providing improved electrical contact. The contact element 16 is preferably formed as a single piece being stamped from a thin sheet of metallic, electrically conductive material. Further, it is preferable, that the metallic material has resilient properties to provide each of the contact arms 46 with a natural spring bias. It is also important that the material selected be of a ferro-magnetic type material to allow the contact arms 46 to be deflected by a magnet as will be described below. While not required, after the contact element 16 is stamped from a ferro-magnetic material, it may be further plated with a more highly conductive material to enhance its functioning within the switch of the present invention.

The contact element 16 is mounted to the base 14 by fastening the hub 44 onto the face of the base 14. In this manner, the hub 44 is placed into electrical communication with a circuit trace 42 on the base 14 providing a common electrical connection to the hub 44 and each of the fixed ends of the contact arms 46. When installed in this position, with the hub 48 fastened directly to the face of the base 14, the contact ends 48 of the contact arms 46 rest on the contact elements 40 and are slightly deflected from their normal relaxed plane, thereby causing the spring bias in the contact arm 46 to maintain a firm, normally closed position at each of the contact arm 46—contact element 40 interfaces.

Once the fully assembled base 14 is installed into the second compartment 32 of the housing, a faceplate 52 is installed with openings through which the lighting elements 38 protrude. The faceplate 52 is sealed onto the housing 12 and the openings around each of the lighting elements 38 are sealed creating a waterproof flashlight housing 12. Finally, a bezel 18 is rotatably installed and retained in place by a central hub 54. The rotatable bezel 18 includes a spring loaded ball detent 56 and a magnet 58 installed in the back thereof. The ball detent 56 engages grooves 60 provided in the faceplate 52 to provide tactile feedback to the user of the light when rotating the flashlight bezel 18. The tactile feedback notifies the operator that the bezel 18 is in one of the several operational positions and serves to retain the bezel 18 in the desired position until intentionally moved by the operator.

Figure 3:
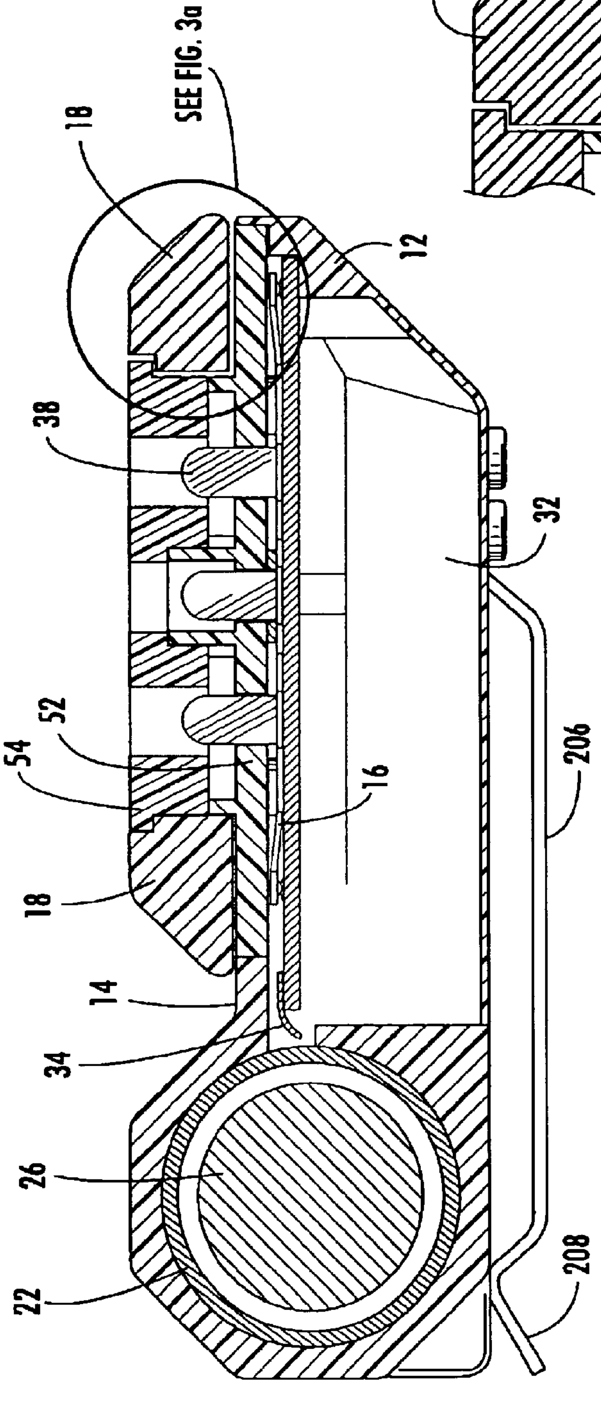
FIG. 3 is a cross-sectional view along line 3—3 of FIG. 2 with the contact element in the normally closed position.
Figure 3A:
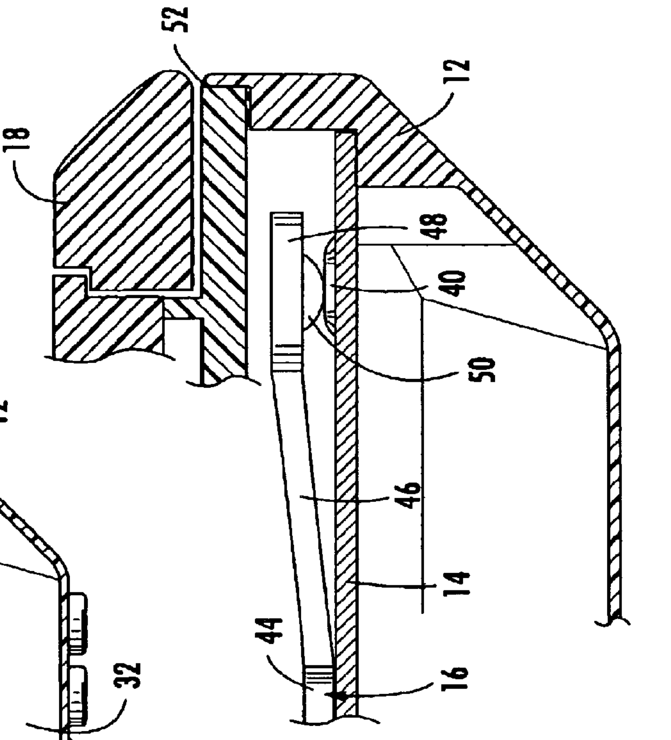
FIG. 3*a* is an exploded view of the contact element of FIG. 3.
Figure 4:
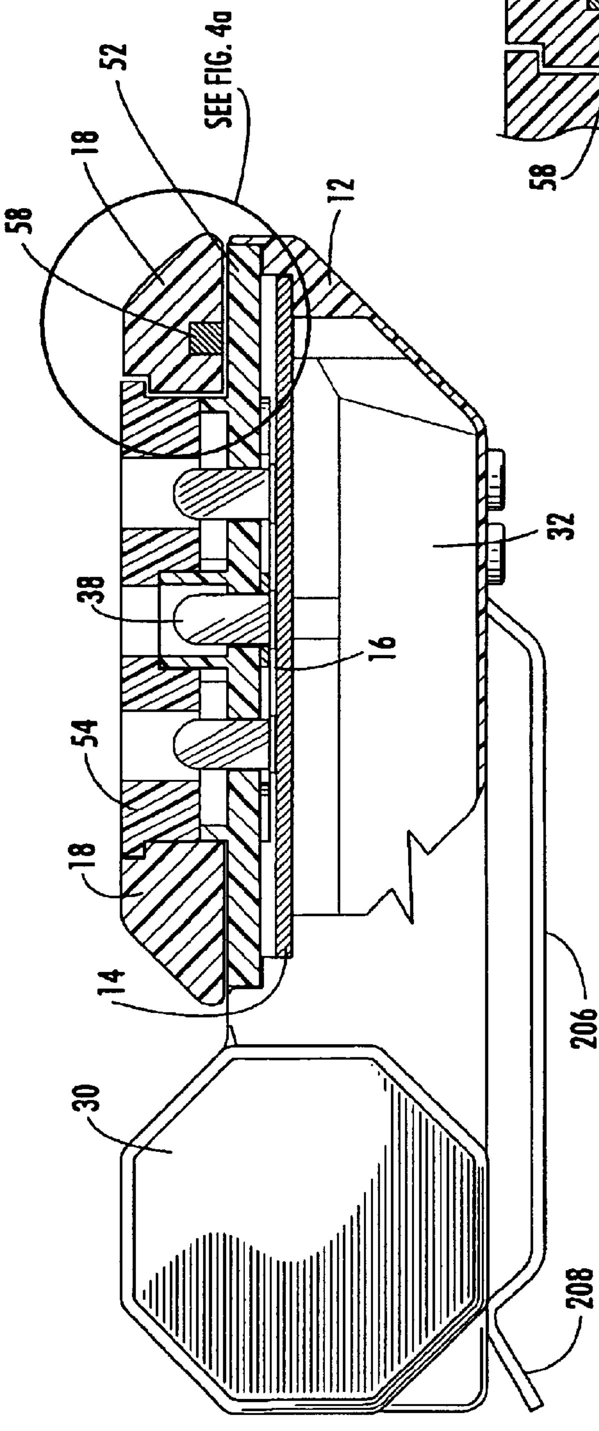
FIG. 4 is a cross-sectional view along line 3—3 of FIG. 2 with the contact element in the open position.
Figure 4A:
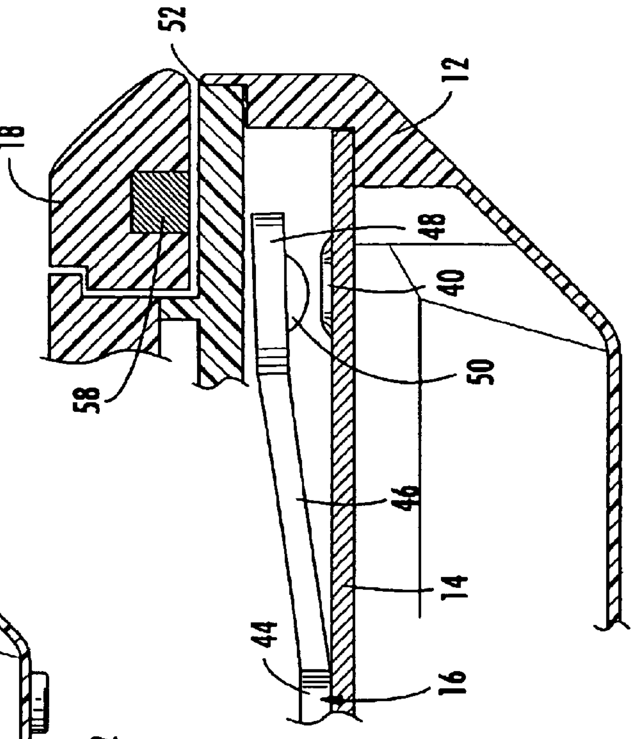
FIG. 4*a* is an exploded view of the contact element of FIG. 4.

Turning now to FIGS. 3–4*a*. The flashlight of the present invention is shown in cross-section to illustrate the functioning of the switch. In this view, it can be seen that the bezel 18 serves as an actuator for the flashlight 10. This actuator function is accomplished by the small magnet 58 mounted therein. As can best be seen in FIGS. 3 and 3*a* the switch is shown in the normally closed position. The contact arm 46 is in the relaxed state where the contact end 48 of the arm 46 is in firm contact with the contact pad 40 on the base 14. The cross-sectional view of the bezel 18 shows that the magnet 58 is not in a position above the contact arm 46. FIGS. 4 and 4*a* show the bezel 18 rotated into a position where the magnet 58 is positioned above the contact arm 46 in an operable position. Because the contact arms 46 are formed from a ferro-magnetic material, with the magnet 58 in the position shown, the magnetic force attracts the particular contact arm 46 located directly beneath the magnet 58, lifting it from the contact pad 40 on the switch body 14 thereby opening that particular circuit. When the bezel 18 is again rotated and the magnet 58 is moved to the next position, the spring bias in the contact arm 46 causes it to return to its relaxed, normally closed position.

Figure 6:
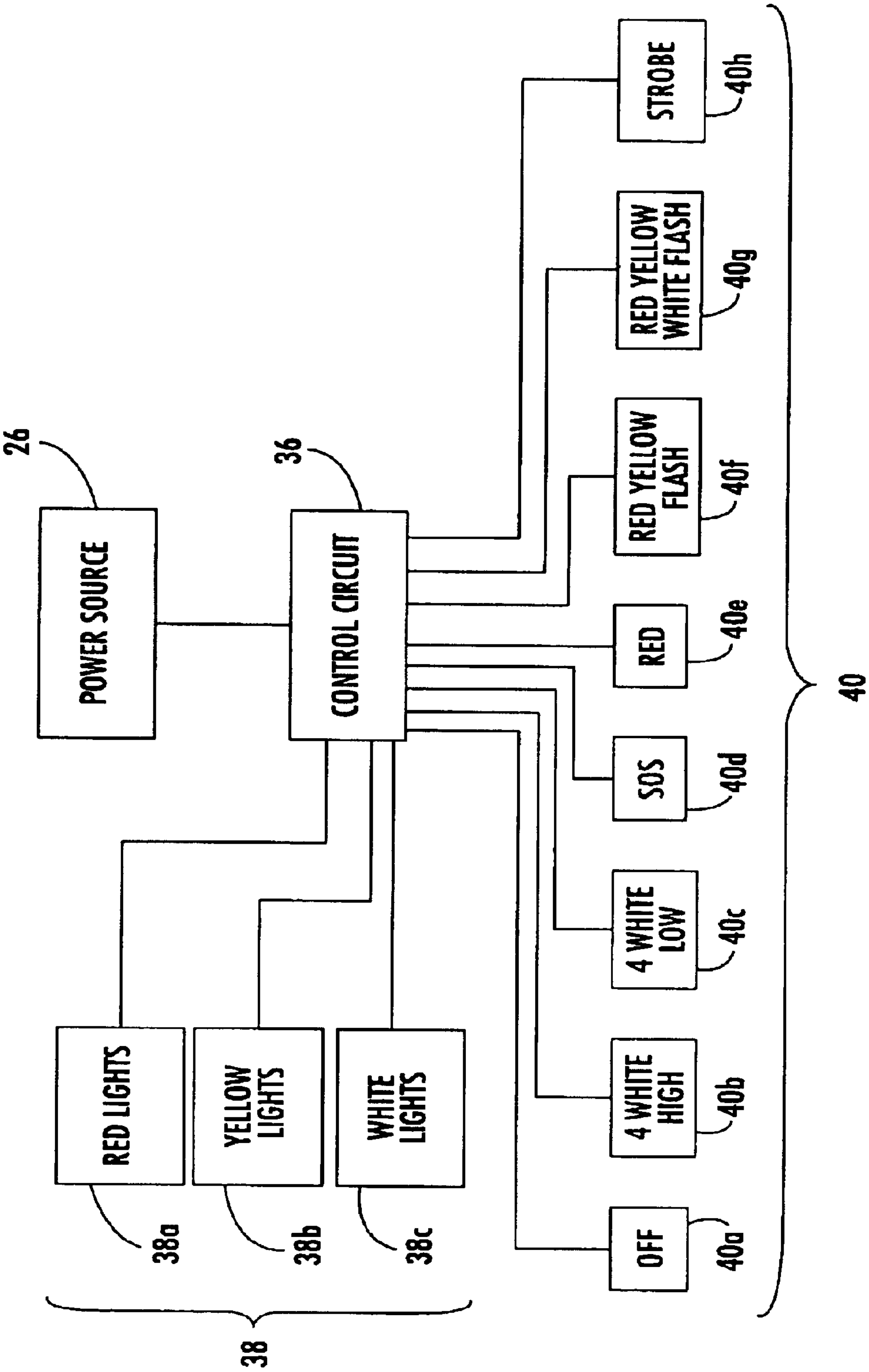
FIG. 6 is a schematic block diagram of the electronic components of the invention.

Referring to FIG. 6, the present invention further provides electronic control circuitry 36 on the base 14 that is in electrical communication with the battery 26, the lighting elements 38 divided into three color groups of red 38*a*, yellow 38*b* and white 38*c*, the contact elements 40*a*–40*h* and the switching element 16. The control circuitry 36 monitors the status of each of the switching positions 40*a*–40*h* on the base 14 to determine which switch positions 40*a*–40*h* are closed and which single switch position 40*a*–40*h* is open. The control circuit 36 has programming that includes a discrete set of instructions that corresponds to each of the possible switching configurations and uses the instruction set corresponding to each particular switch position to illuminate the lighting elements 38 in a particular manner or pattern. For example, the first position 40*a* has an instruction set that provides an off position where all non-control functions of the light 10 are de-energized. Other positions include illumination of a discrete number of the lighting elements 38 to provide a high 40*b* and low 40*b* illumination of the white lighting elements 38*c*. Further, the instructions included with other positions of the switch include programming that provides a blinking SOS pattern 40*d* of the white lights 38*c*, red light only 38*a*, red/yellow flash 40*f* where the control circuit 36 cycles an alternating red light 38*a*, yellow light 38*b* flashing pattern, a red/yellow/white flash 40*g* and a white light 38*c* strobe pattern 40*h*.

Figure 5:
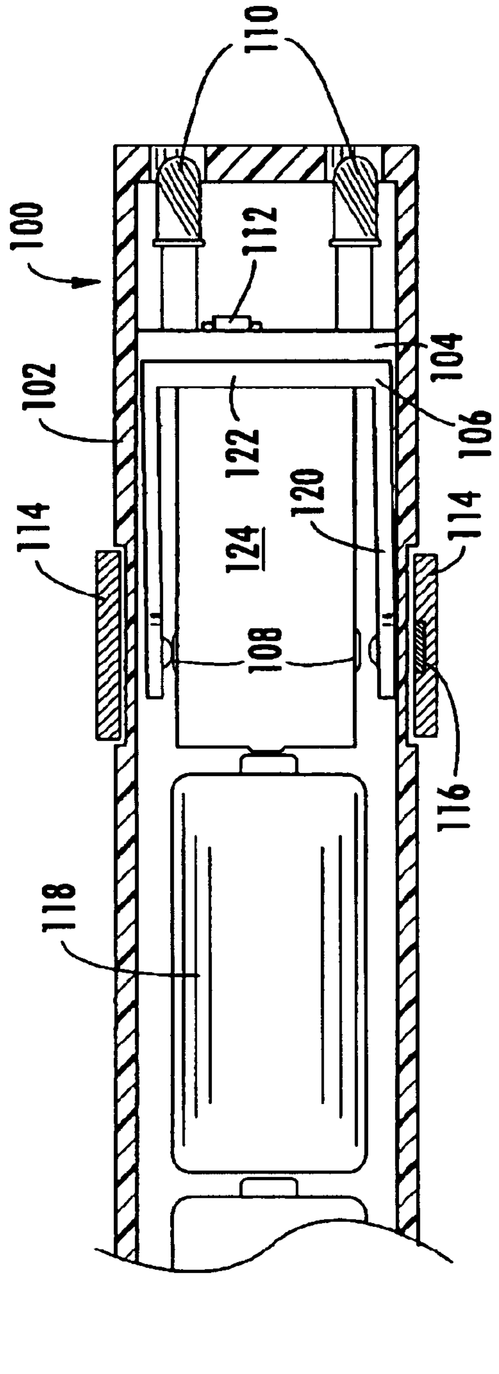
FIG. 5 is a cross sectional view of an alternative embodiment of the rotary switch of the present invention.

Now turning to FIG. 5, a second embodiment of the rotary switch of the present invention is shown. In this embodiment, the switch is again shown in connection with a flashlight 100, however the flashlight 100 is of a more traditional tubular configuration. As described above, the present invention includes an outer housing 102, a base 104, a contact element 106, contact pads 108, lighting elements 110, control circuitry 112, a rotatable actuator 114 that includes a magnet 116 and batteries 118. While all of the functional elements remain the same, the relationship between the functional elements is slightly varied. In this case, the base 14 is formed in a cylinder having a cylindrical outer surface. The contact pads 108 are arranged in a circular pattern or array around the circumference of the cylindrical outer surface. The hub 122 of the contact element 116 is mounted to the top end of the base 104 and the contact arms 120 of the contact element 116 are bent to a position that is substantially perpendicular to the hub 122. The contact arms 120 are spring biased inwardly where a cylindrical contact element 124 is placed having the contact element pads 108 thereon in locations that correspond to the contact arms 120. As can be seen in FIG. 5 the actuator 114 is provided as a ring that is rotatable around the outer housing 102 of the flashlight 100 and includes a magnet 116 mounted therein for opening the contact arm 120 located directly thereunder. In this manner, the switch operates exactly as described above. The magnet 116 lifts one contact arm 120 creating an open circuit. When the circuit opens, the control circuitry 112 performs the instructions that correspond to that discrete circuit location. When the magnet 116 is again rotated, that particular contact arm 120 is released closing the circuit at that location.

Alternately, the hub of the switch element may be rigidly connected to the base and the contact element pads may be provided on a flexible circuit tape structure that is placed on the interior of the flashlight barrel. In this configuration, each of the discrete switches would be spring biased to a normally open position. The magnet is installed in the rotatable sleeve on the exterior of the flashlight, allowing the user to selectably rotate the sleeve thus changing the contact configuration of the contact arms to a closed position. It should be understood that while a circular and cylindrical array is shown and illustrated herein, any desired switching configuration could be achieved. For example, a linear switch could also be provided where the hub is linear and the contact arms extend outwardly along one side. The actuator would then be slideably mounted above the switch element. Once assembled in this manner, it can be seen that the switch would then operate as described above.

Figure 7:
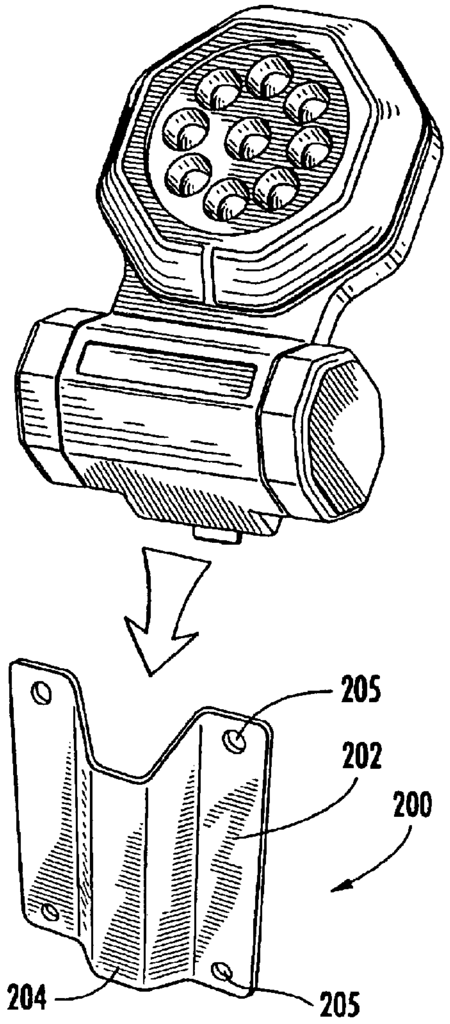
FIG. 7 is a perspective view of a wall-mounting bracket for use with the flashlight of the present invention.

Turning to FIG. 7, one embodiment of a wall-mounting bracket 200 of the present invention is shown. A plate 202 is provided, that is preferably formed from a molded plastic material although is could also be formed of any suitable material such as a stamped or cast metal. The plate 202 has a central portion 204, which projects forward relative to the plane of the plate 202. The central portion 204 is configured to receive the flashlight 10 in a mated fashion. The plate 202 is mounted to a surface where the flashlight 10 is desired to be placed by installing fasteners 205 such as screws or by using an adhesive material. In this manner, the plate 202 is rigidly connected to the desired mounting surface. Once, the plate 202 is in stalled in the desired location, the flashlight 10 can be installed onto the plate 202.

To facilitate mounting onto the plate 202, the flashlight 10 includes a clip 206 mounted to the rear of the flashlight 10 housing 12. The clip 206 is preferably a metallic material that is rigidly attached to the housing 12 as one end. The clip 206 could also be formed from a plastic material and could be formed integrally as a component of the housing 12 and still fall within the scope of this disclosure. The opposite end of the clip 206 is spring biased against the housing 12 to assist in holding the flashlight 10 in the position where it is placed. Specifically, the flashlight 10 is installed onto to the plate 202 by sliding the clip 206 on the back of the flashlight 10 housing 12 behind the central portion 204 of the plate 202. When fully installed onto the mounting bracket 200, the detent 208 on the free end of the clip 206 is extended below a bottom edge of the plate 202 thereby holding the flashlight 10 firmly in place on the mounting bracket 200.

Figure 8:
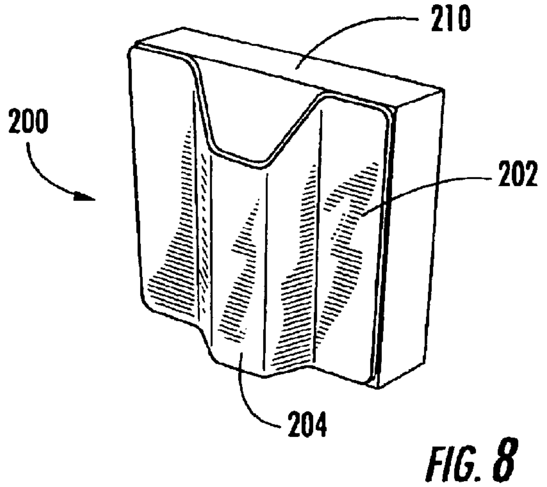
FIG. 8 is a perspective view of a magnetic mounting bracket therefor.

Turning now to FIG. 8, the mounting bracket 200 is shown installed in conjunction with a magnet 210. The plate 202 of the mounting bracket 200 is adhered to the magnet 210 as described above. The use of the magnet 210 in conjunction with the mounting bracket 200 allows the mounting bracket 200 to be temporarily installed onto any ferro-magnetic surface to assist in placement and direction of the light output from the flashlight 10. For example, should the light output from the flashlight 10 be needed when the user is working on repairing an automobile, the magnet 210 allows the mounting bracket 200 to be placed on the interior of the vehicle's engine compartment thereby directing illumination onto the area requiring repair will allowing the user two free hands with which to effect the repair.

Figure 9:
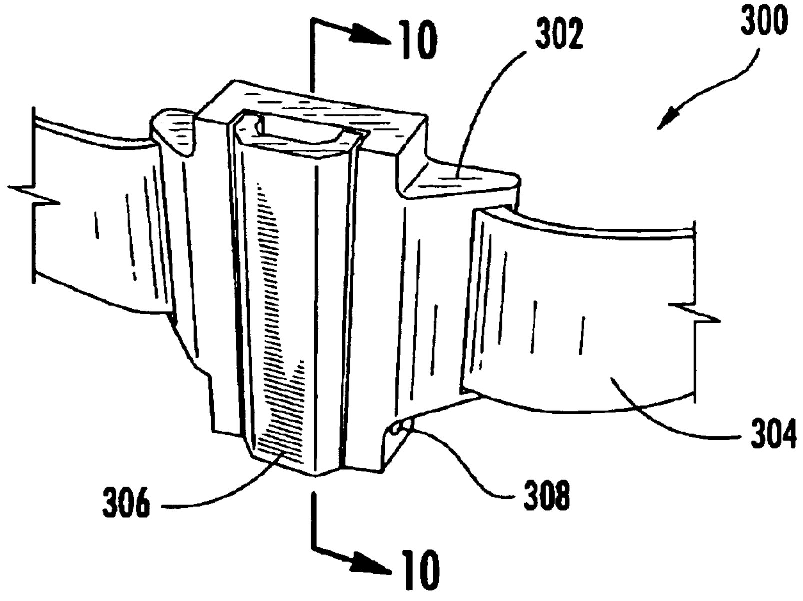
FIG. 9 is a perspective view of headgear mounting bracket therefor.
Figure 10:
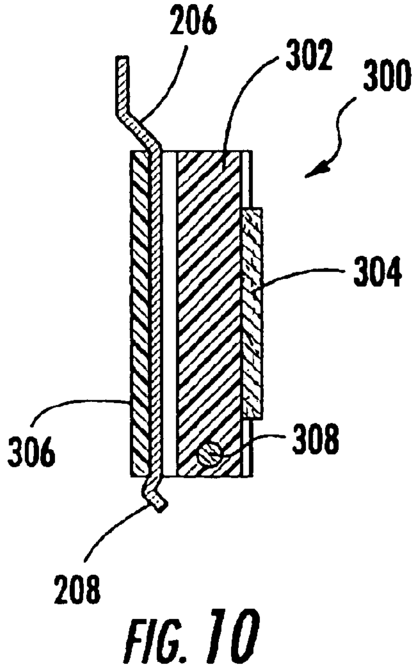
FIG. 10 is a cross-sectional view of the headgear bracket in FIG. 9 in a closed position, taken along the Line 10—10.
Figure 10A:
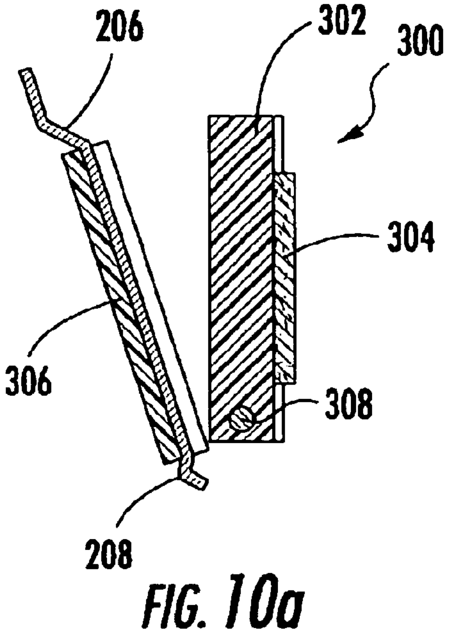
FIG. 10*a* is a cross-sectional view of the headgear bracket in FIG. 9 in a tilted open position, taken along the Line 10—10.

Turning now to FIG. 9, another embodiment of the mounting bracket 300 is shown. Again, a plate 302 is provided. However, in this embodiment the plate 302 is configured to receive a mounting strap 304. The mounting strap 304 is attached to the plate 302, allowing the plate 302 to be attached to a variety of objects. In particular, the mounting strap 304 can serve as a headband allowing the mounting bracket 300 to be worn on the head of a user. Alternatively, the strap 304 could also be worn around other body parts such as on the user's arm thereby placing the mounting bracket 300 in the most desirable location for the user. The mounting bracket 300 of this embodiment also includes a raised central portion 306 that is a separate component, which is attached to the mounting bracket 300 in a pivotable fashion. A fastener 308 is provided to attach the central portion 306 to the plate 302, while allowing the central portion 306 to be articulated relative to the plate 302 around the axis of the fastener 308. As can be best seen in FIGS. 10 and 10*a*, the clip 206 on the flashlight 10 is received behind the central portion 306 of the bracket 300. When the flashlight 10 is mounted in this manner, articulation of the central portion 306 relative to the mounting plate 302 allows the flashlight 10 to be tilted relative to the surface to which the bracket 300 is mounted. A further feature is that when the central portion 306 is rotated, the detent 208 on the bottom of the clip 206 is captured beneath the plate 302 preventing the light from being accidentally dislodged from the mounting bracket 300. It should also be evident that the mounting plate 200 shown in FIGS. 7 and 8 above could also be fabricated using the articulating assembly shown in FIG. 9 and still fall within the scope of this disclosure.

It can therefore be seen that the present invention provides a universal flashlight mounting assembly for use with a flashlight device. Further, the present invention can be modified to accommodate a number of different configurations to facilitate its incorporation with a broad variety mounting conditions where illumination by a portable flashlight may be required. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An assembly for removably receiving and supporting a flashlight comprising in combination:

a mounting plate including;

a raised mounting region having a first side, a second side and a raised central portion between said first and second sides, at least one mounting bracket connected to one of said first second sides of said raised mounting region, and means for attaching said mounting plate to a mounting surface; and a flashlight including;

a housing, said housing having a front side and a rear side, wherein the light output from said flashlight is directed from said front side of said housing, and a clip heaving a first end and a second end opposite said first end, said first end attached to said rear side of said housing, wherein said second end of said clip is selectively slideably engagable with said raised mounting region of said mounting plate.

2. The assembly of claim 1, wherein said at least one mounting bracket is two mounting brackets connected to said first and second sides of said mounting region.

3. The assembly of claim 1, said means for attaching said mounting plate to a mounting surface further comprising:

holes in said at least one mounting bracket; and fasteners installed through said holes.

4. The assembly of claim 1, said means for attaching said mounting plate to a mounting surface further comprising:

an adhesive material applied to a rear surface of said at least one mounting bracket.

5. The assembly of claim 1, said means for attaching said mounting plate to a mounting surface further comprising:

a magnet attached to a rear surface of said at least one mounting bracket.

6. The assembly of claim 1, wherein said at least one mounting bracket includes a receiving slot, said raised mounting region received in said receiving slot wherein said first and second sides of said raised mounting region are pivotably connected to said receiving slot.

7. The assembly of claim 2, wherein said at least one mounting bracket includes a receiving slot, said raised mounting region received in said receiving slot wherein said first and second sides of said raised mounting region are pivotably connected to said receiving slot.

8. The assembly of claim 6, wherein said means for attaching said mounting plate includes a strap.

9. The assembly of claim 8, wherein said strap has a length that is adjustable, said strap being configured to be worn the head of a user.

* * * * *